(12) United States Patent
Zhang et al.

(10) Patent No.: US 10,370,268 B2
(45) Date of Patent: Aug. 6, 2019

(54) WATER PURIFICATION SYSTEM

(71) Applicants: FOSHAN SHUNDE MIDEA WATER DISPENSER MFG. CO., LTD., Foshan (CN); MIDEA GROUP CO., LTD., Foshan (CN)

(72) Inventors: Xingzhi Zhang, Foshan (CN); Zhifeng He, Foshan (CN)

(73) Assignees: FOSHAN SHUNDE MIDEA WATER DISPENSER MFG. CO., LTD., Foshan, Guangdong (CN); MIDEA GROUP CO., LTD., Foshan, Guangdong (CN)

( * ) Notice: Subject to any disclaimer, the term of this patent is extended or adjusted under 35 U.S.C. 154(b) by 0 days.

(21) Appl. No.: 15/861,519

(22) Filed: Jan. 3, 2018

(65) Prior Publication Data

US 2018/0257954 A1 Sep. 13, 2018

Related U.S. Application Data

(63) Continuation of application No. PCT/CN2017/086004, filed on May 25, 2017.

(30) Foreign Application Priority Data

Mar. 7, 2017 (CN) .......................... 2017 1 0132567
Mar. 7, 2017 (CN) ...................... 2017 2 0218893 U (51) Int. Cl.
*C02F 1/44* (2006.01)
*C02F 1/00* (2006.01)
(Continued)

(52) U.S. Cl.
CPC .............. *C02F 1/44* (2013.01); *B01D 61/027* (2013.01); *B01D 61/08* (2013.01); *B01D 63/06* (2013.01);
(Continued)

(58) Field of Classification Search
CPC . C02F 1/44; C02F 9/005; C02F 1/003; B01D 61/08; B01D 63/06; B01D 61/027
See application file for complete search history.

(56) References Cited

U.S. PATENT DOCUMENTS

2005/0183996 A1  8/2005  Zemel et al.

FOREIGN PATENT DOCUMENTS

| CN | 104528976 A | 4/2015 |
| CN | 105540902 A | 5/2016 |

(Continued)

OTHER PUBLICATIONS

Midea, International Search Report and Written Opinion, PCT/CN201708600, dated Dec. 8, 2017, 14 pgs. (No translation available).

*Primary Examiner* — Chester T Barry
(74) *Attorney, Agent, or Firm* — Morgan, Lewis & Bockius LLP (57) ABSTRACT

A water purification system includes: a composite filter-cartridge assembly, a booster pump, a waste water solenoid valve and a water storage device. The composite filter-cartridge assembly includes a filtering housing and a composite filter-cartridge. The filtering housing has a raw water inlet, a pure water opening, a pure water outlet and a concentrated water outlet. The composite filter-cartridge includes a filtering assembly and a taste improvement filter-cartridge disposed downstream from the filtering assembly. The pure water opening is coupled to a water outlet end of the filtering assembly and a water inlet end of the taste improvement filter-cartridge. The booster pump is connected to the raw water inlet, the waste water solenoid valve is connected to the concentrated water outlet, and the water storage device is connected to the pure water opening.

10 Claims, 4 Drawing Sheets

(51) Int. Cl.
 *B01D 61/02* (2006.01)
 *B01D 63/06* (2006.01)
 *B01D 61/08* (2006.01)
 *C02F 9/00* (2006.01)
 *C02F 1/28* (2006.01)

(52) U.S. Cl.
 CPC .............. *C02F 1/003* (2013.01); *C02F 9/005* (2013.01); *C02F 1/001* (2013.01); *C02F 1/283* (2013.01); *C02F 1/441* (2013.01); *C02F 1/442* (2013.01); *C02F 2307/10* (2013.01)

(56) References Cited

FOREIGN PATENT DOCUMENTS

| | | |
|---|---|---|
| CN | 105621506 A | 6/2016 |
| CN | 206562313 U | 10/2017 |

WATER PURIFICATION SYSTEM

PRIORITY CLAIM AND RELATED APPLICATION

This application is a continuation application of PCT/CN2017/086004, entitled "WATER PURIFICATION SYSTEM" filed on May 25, 2017, which claims priority to Chinese Patent Application No. 201710132567.8, filed with the State Intellectual Property Office of the People's Republic of China on Mar. 7, 2017, and entitled "WATER PURIFICATION SYSTEM", and Chinese Patent Application No. 201720218893.6, filed with the State Intellectual Property Office of the People's Republic of China on Mar. 7, 2017, and entitled "WATER PURIFICATION SYSTEM", all of which are incorporated herein by reference in their entirety.

TECHNICAL FIELD

The present disclosure relates to a technical field of water treatment, and especially to a water purification system.

BACKGROUND

In the related art, an integrated composite filter-cartridge has advantages of a small volume and less joints, which results an increasing application and research of it in a water purification system. However, a post activated carbon filter-cartridge configured for improving a taste in the water purification system is usually positioned outside of the integrated filter-cartridge, which is unbeneficial for miniaturization of a size of a complete machine. In addition, when an insufficient water pressure arises, it is likely to cause a reduced water flux for the whole water purification system, thus a less amount of water yield is resulted and a requirement of the user for a high water flux cannot be satisfied.

SUMMARY

The present disclosure aims to solve at least one of the technical problems existing in the prior art. Thus, the present disclosure provides a water purification system which has a simple structure, less joints, a small size and can satisfy a requirement of the user for a high water flux.

The water purification system according to embodiments of the present disclosure includes: a composite filter-cartridge assembly including a filtering housing and a composite filter-cartridge disposed in the filtering housing, the filtering housing having a raw water inlet, a pure water opening, a pure water outlet and a concentrated water outlet, the composite filter-cartridge including a filtering assembly and a taste improvement filter-cartridge disposed downstream from the filtering assembly, the pure water opening being coupled to a water outlet end of the filtering assembly and coupled to a water inlet end of the taste improvement filter-cartridge; a booster pump connected to the raw water inlet; a waste water solenoid valve connected to the concentrated water outlet; a water storage device connected to the pure water opening and configured for storing pure water flowing out of the pure water opening.

In the water purification system according to embodiments of the present disclosure, with an integrated filter-cartridge composite of the taste improvement filter-cartridge and the filtering assembly, it is further beneficial for miniaturization of the size of the complete machine and for reducing an amount of the joints and a risk of water leakage. In addition, by means of the water storage device arranged, it is possible to storage the pure water in the water storage device so as to be able to satisfy a requirement of the user for a high water flux even when the water pressure is insufficient.

According to some embodiments of the present disclosure, the water storage device includes: a water storage container configured for storing the pure water; a lower-pressure switch connected between the water storage container and the pure water opening; a water pump connected between the water storage container and the pure water opening and configured for delivering the pure water in the water storage container to the pure water opening. Thus, with the water pump for delivering the pure water in the water storage container to the pure water opening, a water yield of the purification system is increased. Meanwhile, by means of the lower-pressure switch arranged, it is possible to improve the reliability of the water purification system.

Further, the water storage device further includes: a water intake solenoid valve having a first end connected to the pure water opening and a second end connected to the lower-pressure switch. Thus, by means of the water intake solenoid valve arranged, it is convenient to control communication and cutoff of a water path.

According to some embodiments of the present disclosure, the filtering assembly and the taste improvement filter-cartridge are arranged along a vertical direction. Thus, it is possible to realize a stereo arrangement of the composite filter-cartridge in the up and down direction, and to reduce a diameter of the composite filter-cartridge, which is beneficial for reducing a size of the complete machine.

According to some embodiments of the present disclosure, the filtering assembly includes a pretreatment filter-cartridge and a fine filter-cartridge arranged sequentially from outside to inside, the fine filter-cartridge includes a central water collecting pipe and a fine filtration membrane wound around the central water collecting pipe, the raw water inlet is coupled to a water inlet end of the pretreatment filter-cartridge, and the central water collecting pipe constitutes a water outlet end of the filtering assembly. The composite filter-cartridge further includes: a first end cover disposed to a first end of the filtering assembly in an axial direction and connected to the filtering assembly so as to cover the first end of the filtering assembly in the axial direction; a second end cover formed to be a cylindrical shape and disposed to a second end of the filtering assembly in the axial direction and connected to the pretreatment filter-cartridge, in which the taste improvement filter-cartridge is disposed in the second end cover, the taste improvement filter-cartridge is connected to the central water collecting pipe and located downstream from the fine filter-cartridge, a concentrated water channel and a circulation channel arranged sequentially from outside to inside and spaced apart from each other are defined between the taste improvement filter-cartridge and the second end cover, the concentrated water outlet is coupled to the concentrated water channel, the circulation channel constitutes the water inlet end of the taste improvement filter-cartridge and communicates the pure water opening and the central water collecting pipe, the taste improvement filter-cartridge is provided with a pure water channel configured for the pure water outflow, and the pure water channel is coupled to the pure water outlet.

Thus, by disposing the pretreatment filter-cartridge and the fine filter-cartridge sequentially from outside to inside, and positioning the taste improvement filter-cartridge downstream from the fine filter-cartridge at the axial end of the fine filter-cartridge, the whole composite filter-cartridge is designed to have a stereo arrangement, so that a diameter of the composite filter-cartridge can be reduced, which is beneficial for pressure resistance of the filtering housing 11. Meanwhile, the structure is simple, the volume is small, the miniaturization of the complete machine is benefited and the quality of the outflow water is good.

According to further embodiments of the present disclosure, the water purification system further includes: a connecting casing disposed in the second end cover and connected to the central water collecting pipe, in which the concentrated water channel is defined between the connecting casing and the second end cover, the taste improvement filter-cartridge is disposed in the connecting casing, and the circulation channel is defined between the taste improvement filter-cartridge and an inner wall of the connecting casing. Thus, it facilitates an assembly of the taste improvement filter-cartridge and an isolation of the taste improvement filter-cartridge and the filtering assembly by means of the connecting casing.

Optionally, a protruding block is provided between the inner wall of the connecting casing and the taste improvement filter-cartridge so that the inner wall of the connecting casing and the taste improvement filter-cartridge are spaced apart, and a gap between the inner wall of the connecting casing and the taste improvement filter-cartridge constitutes the circulation channel. Thus, it is beneficial for the formation of the circulation channel by means of the protruding block.

Optionally, an annular protrusion is formed on the connecting casing, and a water outlet end of the central water collecting pipe is fitted in the annular protrusion. Thus, it facilitates a connection between the taste improvement filter-cartridge and the fine filter-cartridge, and the connection is rapid and reliable.

Optionally, the water purification system further includes: a first positioning element and a second positioning element, in which the first positioning element and the second positioning element are disposed at two axial ends of the taste improvement filter-cartridge and connected to the taste improvement filter-cartridge respectively. Thus, with the first positioning element and the second positioning element arranged, the taste improvement filter-cartridge can be positioned in the connecting casing conveniently.

Further, the taste improvement filter-cartridge is configured to be a tubular shape, an inner hole of the taste improvement filter-cartridge constitutes the pure water channel, the first positioning element includes a first positioning body and a first limit protrusion formed on the first positioning body, the first positioning body covers a first end of the taste improvement filter-cartridge adjacent to the central water collecting pipe, the first limit protrusion is fitted in the inner hole of the taste improvement filter-cartridge, the second positioning element includes a second positioning body and a second limit protrusion formed on the second positioning body, the second positioning body is disposed to a second end of the taste improvement filter-cartridge away from the central water collecting pipe, and the second limit protrusion is fitted in the inner hole of the taste improvement filter-cartridge and provided with a water drain hole penetrating the second positioning element along the axial direction.

Thus, by disposing the taste improvement filter-cartridge to be the tubular shape, it facilitates the formation of the pure water channel in the taste improvement filter-cartridge. In addition, with the first limit protrusion on the first positioning element and the second limit protrusion on the second positioning element being fitted with the inner hole of the taste improvement filter-cartridge respectively, it is possible to make an assembly and positioning of the taste improvement filter-cartridge more convenient and rapid and make the structure of the flow path in the composite filter-cartridge simple.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCE NUMERALS water purification system 100,
composite filter-cartridge assembly 1,
filtering housing 11, raw water inlet 111, pure water outlet 112, concentrated water outlet 113, pure water opening 114,
composite filter-cartridge 12, pretreatment filter-cartridge 121, fine filter-cartridge 122, central water collecting pipe 1221, fine filtration membrane 1222, taste improvement filter-cartridge 123,
first end cover 124, first the first flanging portion 1241, second flanging portion 1242, first accommodating cavity 1243, mounting boss 1244,
second end cover 125, third flanging portion 1251, fourth flanging portion 1252, second accommodating cavity 1253,
connecting casing 126, protruding block 1261, annular protrusion 1262, through hole 1263, sealing element 1264,
first positioning element 127, first positioning body 1271, fifth flanging portion 1272, first limit protrusion 1273,
second positioning element 128, second positioning body 1281, sixth flanging portion 1282, second limit protrusion 1283, water drain hole 1284,
pre-filtering mesh 2, raw water intake solenoid valve 3, booster pump 4, one-way valve 5, high pressure switch 6, waste water solenoid valve 7, tap 8,
water storage container 91, water pump 92, lower-pressure switch 93, water intake solenoid valve 94,
concentrated water channel a1, circulation channel a2, pure water channel a3,
water inlet pipeline b1, pure water pipeline b2, concentrated water pipeline b3, water storage pipeline b4.

DETAILED DESCRIPTION

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "central," "upper," "lower," "vertical," "horizontal," "top," "bottom," "inner," "outer," "axial direction," "radial direction," and "circumferential direction" should be construed to refer to the orientation as then described or as shown in the drawings under discussion. These relative terms are for convenience of description and do not require that the present invention be constructed or operated in a particular orientation, thus cannot be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" should be construed broadly, and may be, for example, fixed connections, detachable connections, or integral connections; may also be direct connections or indirect connections via intervening structures; may also be inner communications of two elements, which can be understood by those skilled in the art according to specific situations.

A water purification system 100 according to embodiments of the present disclosure will be described below with reference to FIG. 1 to FIG. 4.

As shown in FIG. 1 to FIG. 4, the water purification system 100 according to embodiments of the present disclosure includes: a composite filter-cartridge assembly 1, a booster pump 4, a waste water solenoid valve 7 and a water storage device.

Specifically, the composite filter-cartridge assembly 1 includes a filtering housing 11 and a composite filter-cartridge 12 disposed in the filtering housing 11. The filtering housing 11 has a raw water inlet 111, a pure water opening 114, a pure water outlet 112 and a concentrated water outlet 113. The composite filter-cartridge 12 includes a filtering assembly and a taste improvement filter-cartridge 123 disposed downstream from the filtering assembly. The pure water opening 114 is coupled to a water outlet end of the filtering assembly and coupled to a water inlet end of the taste improvement filter-cartridge 123. Thus, with an integrated filter-cartridge composite of the taste improvement filter-cartridge 123 and the filtering assembly, it is further beneficial for miniaturization of a size of the complete machine and for reducing an amount of the joints and a risk of water leakage. When the filter-cartridge is to be replaced, it is just needed to replace one filter-cartridge integrally in one time, which reduces a replacement frequency for the user and is convenient for the user to use.

The booster pump 4 is connected to the raw water inlet 111 and configured for increasing a water feeding pressure. The waste water solenoid valve 7 is connected to the concentrated water outlet 113 and configured for adjusting a proportion of the waste water so as to balance a working pressure of the water purification system 100. The water storage device is connected to the pure water opening 114 and configured for storing pure water flowing out of the pure water opening 114. Thus, by means of the water storage device arranged, it is possible to storage the pure water in the water storage device so as to be able to satisfy a requirement of the user for a high water flux even when the water pressure is insufficient.

An operation process of the water purification system 100 will be briefly described below referring to FIG. 1 to FIG. 4.

Referring to FIG. 1 to FIG. 4, raw water pressurized through the booster pump 4 enters the filtering housing 11 from the raw water inlet 111 of the filtering housing 11, and is filtered via the filtering assembly. Pure water formed after a filtration of the filtering assembly flows out through the pure water opening 114 of the filtering housing 11 and flow into the water storage device, and the pure water is stored in the water storage device for drinking. Concentrated water produced is discharged out of the water purification system 100 through the concentrated water outlet 113 of the filtering housing 11.

When one needs to drink water, the pure water stored in the water storage device can return to the filtering housing 11 through the pure water opening 114 and enter the water inlet end of the taste improvement filter-cartridge 123. Meanwhile, the raw water entering from the raw water inlet 111 can enter the water inlet end of the taste improvement filter-cartridge 123 after filtered by the filtering assembly sequentially. The pure water entering the water inlet end of the taste improvement filter-cartridge 123 flows out through the pure water outlet 112 of the filtering housing 11 for drinking after filtered by the taste improvement filter-cartridge 123 to improve the taste. Thus, it is possible to increase a water flux and a water yield in unit time so as to be able to satisfy a requirement of the user for a high water flux even when the water pressure is insufficient. In addition, by disposing the water storage device upstream of the taste improvement filter-cartridge 123, it is possible to remove the peculiar smell of the pure water produced due to a long period of storage and to guarantee a final quality of outflow water of the water purification system 100.

In the water purification system 100 according to embodiments of the present disclosure, with an integrated filter-cartridge composite of the taste improvement filter-cartridge 123 and the filtering assembly, it is further beneficial for miniaturization of the size of the complete machine and for reducing an amount of the joints and a risk of water leakage. In addition, by means of the water storage device arranged, it is possible to storage the pure water in the water storage device so as to be able to satisfy a requirement of the user for a high water flux even when the water pressure is insufficient.

Figure 1:
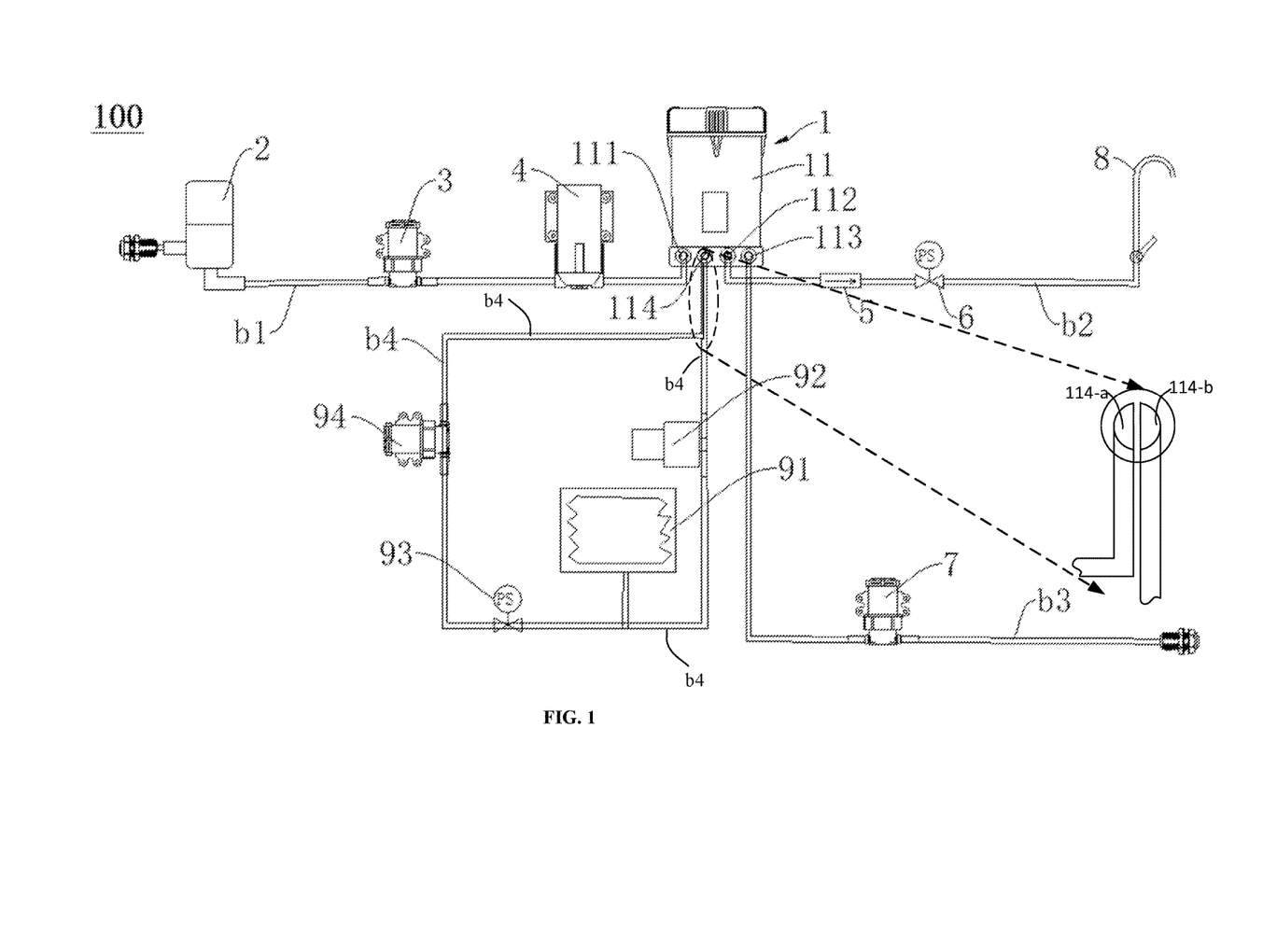
FIG. 1 is a schematic view of a water purification system according to embodiments of the present disclosure.

According to some embodiments of the present disclosure, referring to FIG. 1, the water storage device includes: a water storage container 91 configured for storing the pure water, a lower-pressure switch 93, and a water pump 92. The lower-pressure switch 93 is connected between the water storage container 91 and the pure water opening 114. The lower-pressure switch 93 judges whether the water storage container 91 is full of the pure water by detecting the water pressure in the pipeline. When the water storage container 91 is full of water, the water pressure in the pipeline is larger, at this point the lower-pressure switch 93 is off to prevent a water leakage and damage due to excessive pressure in the water storage container 91, thus improving a reliability of the water purification system 100. When a water level in the water storage container 91 is lower, the water pressure in the pipeline is lower and the lower-pressure switch 93 is closed. The water pump 92 is connected between the water storage container 91 and the pure water opening 114 and configured for delivering the pure water in the water storage container 91 to the pure water opening 114. Thus, with the water pump 92 for delivering the pure water in the water storage container 91 to the pure water opening 114, a water yield of the purification system is increased. Meanwhile, by means of the lower-pressure switch 93 arranged, it is possible to improve the reliability of the water purification system 100. Optionally, the water storage container 91 may be a water outflow equipment, such as a water bag or a pressure tank and the like.

Further, referring to FIG. 1, the water storage device further includes a water intake solenoid valve 94 having a first end connected to the pure water opening 114 and a second end connected to the lower-pressure switch 93. Thus, by using the water intake solenoid valve 94 and the lower-pressure switch 93 cooperatively, it is not only convenient to control communication and cutoff of a water path, but also improves the reliability of the water purification system 100.

Figure 3:
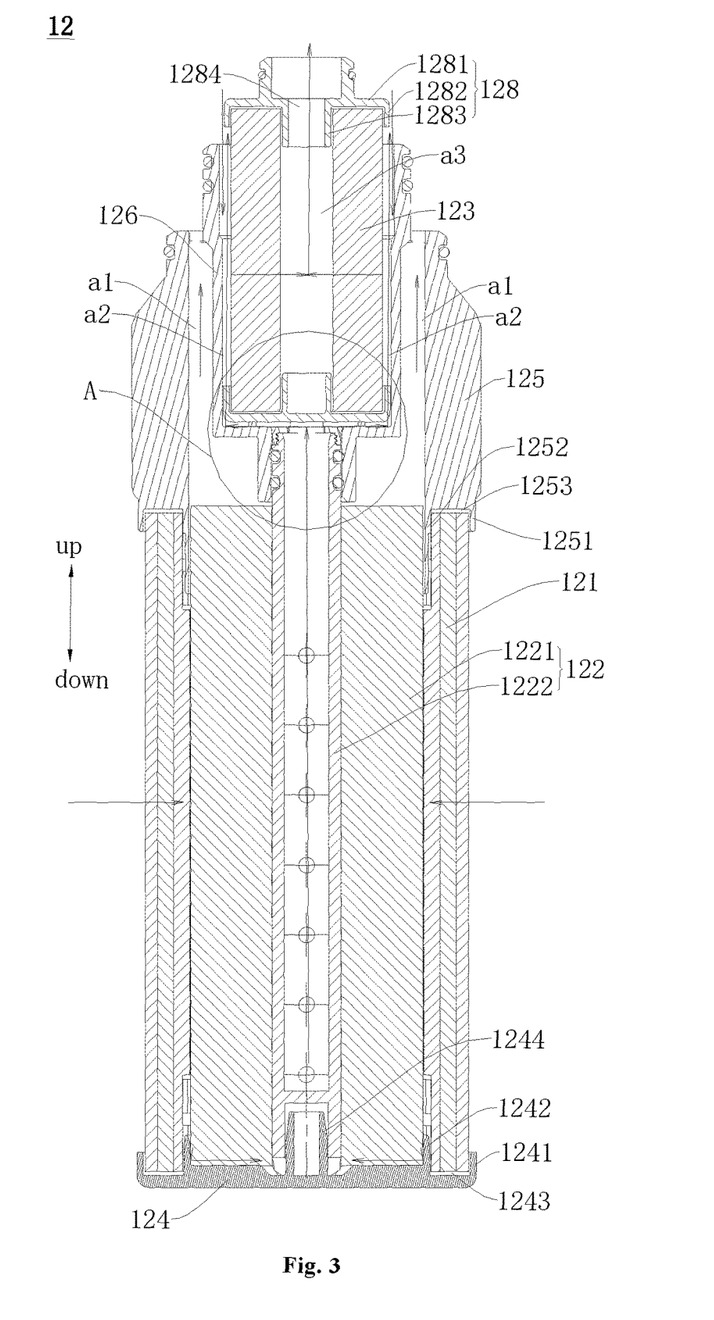
FIG. 3 is a schematic view of a composite filter-cartridge according to embodiments of the present disclosure.

According to some embodiments of the present disclosure, referring to FIG. 3, the filtering assembly and the taste improvement filter-cartridge 123 are arranged along a vertical direction. Thus, it is possible to realize a stereo arrangement of the composite filter-cartridge 12 in the up and down direction, and to reduce a diameter of the composite filter-cartridge 12, which is beneficial for reducing a size of the complete machine. For example, the taste improvement filter-cartridge 123 may be located above the filtering assembly, which makes the whole composite filter-cartridge 12 a reasonable and stable structure, and meanwhile facilitates a flow path design inside the composite filter-cartridge 12.

Figure 4:
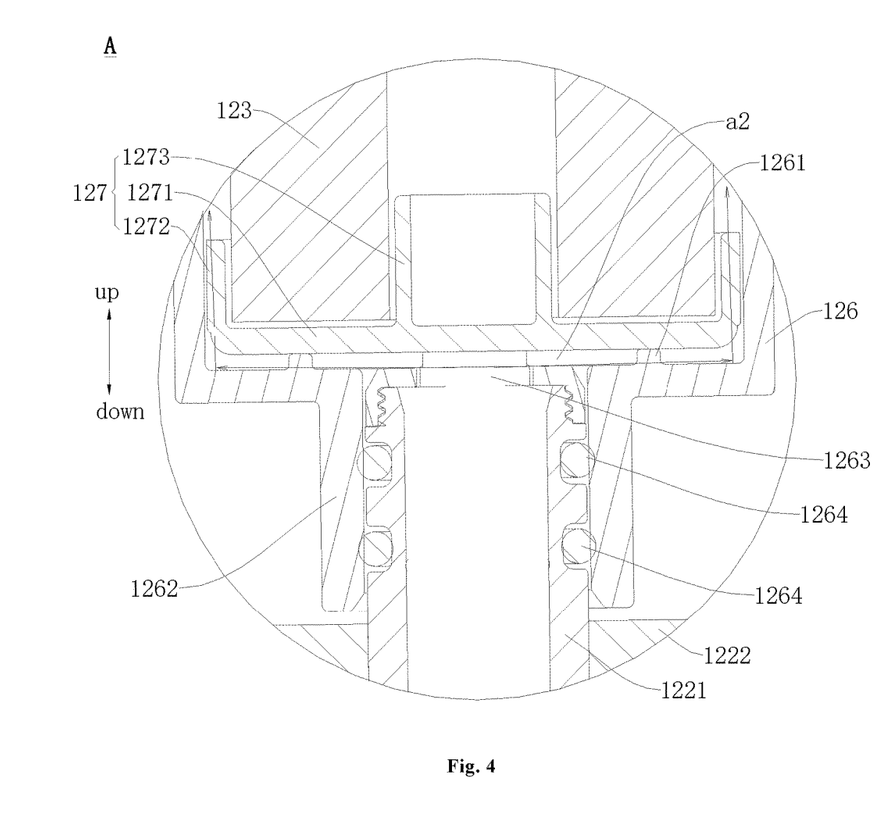
FIG. 4 is an enlarged view of portion A shown in FIG. 3.

According to some embodiments of the present disclosure, referring to FIG. 3 and FIG. 4, the filtering assembly includes a pretreatment filter-cartridge 121 and a fine filter-cartridge 122 arranged sequentially from outside to inside. The fine filter-cartridge 122 includes a central water collecting pipe 1221 and a fine filtration membrane 1222 wound around the central water collecting pipe 1221. The raw water inlet 111 is coupled to a water inlet end of the pretreatment filter-cartridge 121, and the central water collecting pipe 1221 constitutes a water outlet end of the filtering assembly. The pretreatment filter-cartridge 121 may be a PAC (PP And C, PP cotton and activated carbon composite filter-cartridge 12) pretreatment filter-cartridge 121. For example, the pretreatment filter-cartridge 121 may include a PP non-woven winding layer (a precision of the PP non-woven winding layer may be set as 5um) and an activated carbon fiber winding layer distributed sequentially from outside to inside along a radial direction of the composite filter-cartridge 12. The pretreatment filter-cartridge 121 can remove rust and silt, and absorb the abnormal color, odor, residual chlorine and a part of the organics effectively, to ensure the quality of water entering the fine filter-cartridge 122 and hence prolong the service life of the fine filter-cartridge 120. The fine filtration membrane 1222 of the fine filter-cartridge 122 may be a reverse osmosis membrane or a nanofiltration membrane. The fine filter-cartridge 122 can intercept bacteria and viruses, heavy metals and so on. The fine filter-cartridge 122 may be produced by adopting a multi-membrane rolling process, thus improving a performance of the fine filter-cartridge 122.

The composite filter-cartridge 12 further includes a first end cover 124 and a second end cover 125. The first end cover 124 is disposed to a first end (for example, referring to FIG. 3, the first end cover 124 is disposed to a lower end of the filtering assembly) of the filtering assembly in an axial direction and connected to the filtering assembly so as to cover the first end of the filtering assembly in the axial direction. For example, in the example shown in FIG. 3, the first end cover 124 may be formed to be a disc shape, and a first flanging portion 1241 extending upwards and a second flanging portion 1242 located inside the first flanging portion 1241 and spaced apart from the first flanging portion 1241 in the radial direction of the first end cover 124 are formed in a circumferential edge of the first end cover 124. A first accommodating cavity 1243 in an annular shape is formed between the first flanging portion 1241 and the second flanging portion 1242, a lower end of the pretreatment filter-cartridge 121 is accommodated in the first accommodating cavity 1243 and fitted tightly with an inside wall of the first flanging portion 1241 and an outside wall of the second flanging portion 1242. A mounting boss 1244 extending towards the fine filter-cartridge 122 is formed on the first end cover 124, and the mounting boss 1244 is fitted in the central water collecting pipe 1221 of the fine filter-cartridge 122 so that the first end cover 124 can be connected to the filtering assembly stably and reliably.

The second end cover 125 is formed to be a cylindrical shape and disposed to a second end (for example, referring to FIG. 3, the second end cover 125 is disposed to an upper end of the filtering assembly) of the filtering assembly in the axial direction and connected to the pretreatment filter-cartridge 121. For example, in the example shown in FIG. 3, a third flanging portion 1251 and a fourth flanging portion 1252 extending downwards are formed at an outer circumferential edge and an inner circumferential edge of a lower end of the second end cover 125 respectively. A second accommodating cavity 1253 in an annular shape in formed between the third flanging portion 1251 and the fourth flanging portion 1252, an upper end of the pretreatment filter-cartridge 121 is accommodated in the foregoing second accommodating cavity 1253 and fitted tightly with an inside wall of the third flanging portion 1251 and an outside wall of the fourth flanging portion 1252, so that the second end cover 125 can be connected to the pretreatment filter-cartridge 121 stably and reliably.

The taste improvement filter-cartridge 123 is disposed in the second end cover 125, the taste improvement filter-cartridge 123 is connected to the central water collecting pipe 1221 and located downstream from the fine filter-cartridge 122. The taste improvement filter-cartridge 123 may be an activated carbon layer, for example, the taste improvement filter-cartridge 123 may be an activated carbon rod. The taste improvement filter-cartridge 123 can remove volatile organic compounds and the residual chlorine, and keep the necessary minerals for example trace calcium, silicic acid, carbonate and the like to make the taste sweet and soft. A concentrated water channel a1 and a circulation channel a2 arranged sequentially from outside to inside and spaced apart from each other are defined between the taste improvement filter-cartridge 123 and the second end cover 125, the concentrated water outlet 113 is coupled to the concentrated water channel a1, the circulation channel a2 constitutes the water inlet end of the taste improvement filter-cartridge 123 and communicates the pure water opening 114 and the central water collecting pipe 1221. The taste improvement filter-cartridge 123 is provided with a pure water channel a3 configured for the pure water outflow, and the pure water channel a3 is coupled to the pure water outlet 112.

Thus, by disposing the pretreatment filter-cartridge 121 and the fine filter-cartridge 122 sequentially from outside to inside, and positioning the taste improvement filter-cartridge 123 downstream from the fine filter-cartridge 122 at the axial end of the fine filter-cartridge 122, the whole composite filter-cartridge 12 is designed to have a stereo arrangement, so that a diameter of the composite filter-cartridge 12 can be reduced, which is beneficial for pressure resistance of the filtering housing 11. Meanwhile, the structure is simple, the volume is small, the miniaturization of the complete machine is benefited and the quality of the outflow water is good.

The filtering process of the composite filter-cartridge 12 above will be briefly illustrated below referring to FIG. 1 to FIG. 4.

Figure 2:
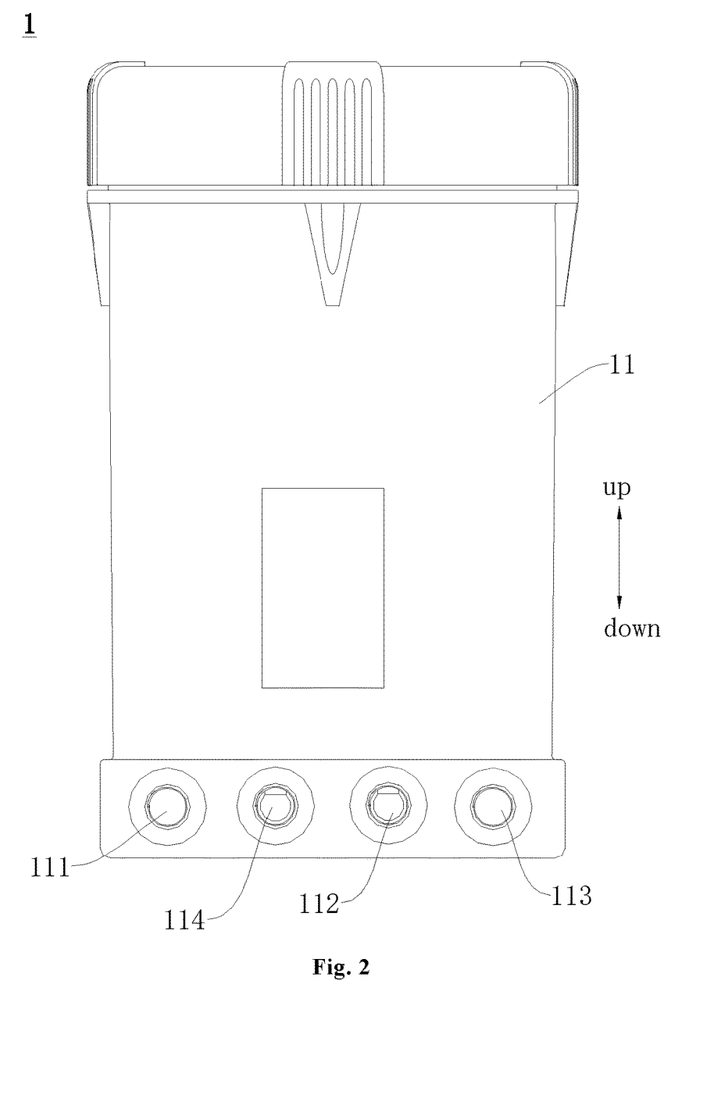
FIG. 2 is a schematic view of a composite filter-cartridge assembly according to embodiments of the present disclosure.

Referring to FIG. 3 (an arrow direction represents a direction of a water flow) in combination with FIG. 1, FIG. 2 and FIG. 4, the raw water is filtered firstly through the pretreatment filter-cartridge 121, then filtered finely through the fine filter-cartridge 122. The water filtered by the fine filter-cartridge 122 is divided into two parts, one of which is the pure water, and the other part is the concentrated water. The pure water is collected by the central water collecting pipe 1221 of the fine filter-cartridge 122, and the pure water in the central water collecting pipe 1221 flows into the circulation channel a2 and into the water storage device for storage through the pure water opening 114 in the filtering housing 11. The concentrated water flows out through the concentrated water channel a1 and the concentrated water outlet 113 in the filtering housing 11 and is discharged out of the water purification system 100 via the waste water solenoid valve 7.

When one needs to drink water, the pure water stored in the water storage device can return to the filtering housing 11 through the pure water opening 114 and enter the circulation channel a2. Meanwhile, the raw water entering from the raw water inlet 111 can be filtered sequentially through the pretreatment filter-cartridge 121 and the fine filter-cartridge 122 of the filtering assembly, in which the pure water flows into the circulation channel a2 through the central water collecting pipe 1221. The pure water entering the circulation channel a2 flows into the pure water channel a3 in the taste improvement filter-cartridge 123 after filtered by the taste improvement filter-cartridge 123 to improve the taste, and then flows out through the pure water outlet 112 of the filtering housing 11 for drinking.

According to further embodiments of the present disclosure, referring to FIG. 3 and FIG. 4, the water purification system 100 further includes a connecting casing 126 disposed in the second end cover 125 and connected to the central water collecting pipe 1221, in which the concentrated water channel a1 is defined between the connecting casing 126 and the second end cover 125, the taste improvement filter-cartridge 123 is disposed in the connecting casing 126, and the circulation channel a2 is defined between the taste improvement filter-cartridge 123 and an inner wall of the connecting casing 126. Thus, it facilitates an assembly of the taste improvement filter-cartridge 123 and an isolation of the taste improvement filter-cartridge 123 and the filtering assembly by means of the connecting casing 126.

Optionally, referring to FIG. 4, a protruding block 1261 is provided between the inner wall of the connecting casing 126 and the taste improvement filter-cartridge 123 so that the inner wall of the connecting casing 126 and the taste improvement filter-cartridge 123 are spaced apart, and a gap between the inner wall of the connecting casing 126 and the taste improvement filter-cartridge 123 constitutes the circulation channel a2. Thus, with the protruding block 1261 arranged, the inner wall of the connecting casing 126 and the taste improvement filter-cartridge 123 are spaced apart, so that the circulation channel a2 can be formed between the taste improvement filter-cartridge 123 and the inner wall of the connecting casing 126, and thus the water out of the central water collecting pipe 1221 of the fine filter-cartridge 122 can flow into the taste improvement filter-cartridge 123 smoothly for filtration. Optionally, the protruding block 1261 above may be formed on the inner wall of the connecting casing 126, one protruding block 1261 may be provided and formed to be an annular shape. The protruding block 1261 may also be a rod shape and a plurality of protruding blocks 1261 spaced apart may be provided.

Optionally, referring to FIG. 3 and FIG. 4, an annular protrusion 1262 is formed on the connecting casing 126, and a water outlet end (an upper end of the central water collecting pipe 1221 in FIG. 3 and FIG. 4) of the central water collecting pipe 1221 is fitted in the annular protrusion 1262. Thus, with the central water collecting pipe 122 being fitted in the annular protrusion 1262 of the connecting casing 126, it facilitates a connection between the taste improvement filter-cartridge 123 and the fine filter-cartridge 122, and the connection is rapid and reliable, and in addition, the pure water in the central water collecting pipe 1221 can flow into the connecting casing 126 smoothly.

Further, referring to FIG. 4, a sealing element 1264 (for example a sealing ring) may be disposed between an inner circumferential wall of the annular protrusion 1262 and an outer circumferential wall of the central water collecting pipe 1221, so that it is possible to guarantee a sealing between the connecting casing 126 and the central water collecting pipe 1221 and prevent the concentrated water in the concentrated water channel a1 from entering the connecting casing 126.

Optionally, the water purification system 100 further includes a first positioning element 127 and a second positioning element 128. The first positioning element 127 and the second positioning element 128 are disposed at two axial ends of the taste improvement filter-cartridge 123 and connected to the taste improvement filter-cartridge 123 respectively. Thus, with the first positioning element 127 and the second positioning element 128 arranged, the taste improvement filter-cartridge 123 can be limited in the axial direction (a vertical direction in FIG. 3), so that the taste improvement filter-cartridge 123 can be positioned in the connecting casing 126 conveniently, which makes a structure of the composite filter-cartridge 12 stable and reliable.

Further, referring to FIG. 3 and FIG. 4, the taste improvement filter-cartridge 123 is formed to be a tubular shape, and both two axial ends of the taste improvement filter-cartridge 123 can be open, which makes the taste improvement filter-cartridge 123 a simple structure and easy to process and shape. The inner hole of the taste improvement filter-cartridge 123 constitutes the pure water channel a3 so that it is not required to arrange the pure water channel a3 in the taste improvement filter-cartridge 123 additionally. The first positioning element 127 includes the first positioning body 1271 and the first limit protrusion 1273 formed on the first positioning body 1271. The first positioning body 1271 covers a first end (referring to a lower end of the taste improvement filter-cartridge 123 in FIG. 3) of the taste improvement filter-cartridge 123 adjacent to the central water collecting pipe 1221, so that the pure water channel a3 in the taste improvement filter-cartridge 123 is spaced apart from the central water collecting pipe 1221, and the water in the central water collecting pipe 1221 is prevented from entering the pure water channel a3 directly without passing through the taste improvement filter-cartridge 123. The first limit protrusion 1273 is fitted in the inner hole of the taste improvement filter-cartridge 123.

The second positioning element 128 includes the second positioning body 1281 and the second limit protrusion 1283 formed on the second positioning body 1281, the second positioning body 1281 is disposed to the second end (referring to an upper end of the taste improvement filter-cartridge 123 in FIG. 3) of the taste improvement filter-cartridge 123 away from the central water collecting pipe 1221, and the second limit protrusion 1283 is fitted in the inner hole of the taste improvement filter-cartridge 123 and provided with a water drain hole 1284 penetrating the second positioning element 128 along the axial direction. Thus, the pure water in the pure water channel a3 can flow out through the water drain hole 1284 in the second positioning element 128 for drinking.

Thus, by disposing the taste improvement filter-cartridge 123 to be the tubular shape, it facilitates the formation of the pure water channel a3 in the taste improvement filter-cartridge 123. In addition, with the first limit protrusion 1273 on the first positioning element 127 and the second limit protrusion 1283 on the second positioning element 128 being fitted with the inner hole of the taste improvement filter-cartridge 123 respectively, it is possible to make an assembly and positioning of the taste improvement filter-cartridge 123 more convenient and rapid and make the structure of the flow path in the composite filter-cartridge 12 simple.

The water purification system 100 according to a specific embodiment of the present disclosure will be described below with reference to FIG. 1 to FIG. 4.

Referring to FIG. 1 to FIG. 4, in the present embodiment, the water purification system 100 includes a composite filter-cartridge assembly 1, a booster pump 4, a waste water solenoid valve 7 and a water storage device mentioned above. Further, the water purification system 100 includes a water inlet pipeline b1, a pure water pipeline b2, a concentrated water pipeline b3, a water storage pipeline b4, a pre-filtering mesh 2, the raw water intake solenoid valve 3, a one-way valve 5, a high pressure switch 6 and a tap 8. The water storage device includes the water storage container 91, the lower-pressure switch 93, the water pump 92 and the water intake solenoid valve 94 mentioned above.

The composite filter-cartridge assembly 1 includes the filtering housing 11 and the composite filter-cartridge 12 mentioned above. The composite filter-cartridge 12 includes the filtering assembly, the first end cover 124, the second end cover 125, the taste improvement filter-cartridge 123, the connecting casing 126, the first positioning element 127 and the second positioning element 128 mentioned above. Further, the filtering assembly includes the pretreatment filter-cartridge 121 and the fine filter-cartridge 122 mentioned above. The first end cover 124 is disposed at a bottom of the filtering assembly and connected to both of the pretreatment filter-cartridge 121 and the fine filter-cartridge 122. The second end cover 125 is disposed at a top of the filtering assembly and connected to the pretreatment filter-cartridge 121. The connecting casing 126 is disposed in the second end cover 125 and has an open upper end and a lower end which has a through hole 1263 coupled to an inner cavity of the connecting casing 126. The annular protrusion 1262 extending downwards is formed on a circumferential edge of the through hole 1263, and the upper end of the central water collecting pipe 1221 is fitted in the annular protrusion 1262.

The taste improvement filter-cartridge 123 is disposed in the connecting casing 126. The first positioning element 127 and the second positioning element 128 are formed at the lower end and the upper end of the taste improvement filter-cartridge 123 respectively. The protruding block 1261 mentioned above is formed on a bottom wall of the connecting casing 126, and the first positioning element 127 is located in the connecting casing 126 and the first positioning body 1271 of the first positioning element 127 is supported on the protruding block 1261 so that the first positioning body 1271 and the bottom wall of the connecting casing 126 can be spaced apart, thus the pure water in the central water collecting pipe 1221 can flow into the circulation channel a2 of the connecting casing 126 smoothly.

The first positioning body 1271 is formed to be a circular shape, a fifth flanging portion 1272 extending upwards is formed on the circumferential edge of the first positioning body 1271, a lower end of the taste improvement filter-cartridge 123 abuts against an inner circumferential wall of the fifth flanging portion 1272, so that a fitting stability of the first positioning element 127 and the taste improvement filter-cartridge 123 can be further improved. The fifth flanging portion 1272 is spaced apart from the inner circumferential wall of the connecting casing 126, then the gap between the first positioning element 127 and the inner wall of the connecting casing 126 and the gap between the outer circumferential wall of the taste improvement filter-cartridge 123 and the inner wall of the connecting casing 126 constitute the circulation channel a2 mentioned above together. The second positioning body 1281 is formed to be a circular shape, a sixth flanging portion 1282 extending downwards is formed on a circumferential edge of the second positioning body 1281. An upper end of the taste improvement filter-cartridge 123 abuts against an inner circumferential wall of the sixth flanging portion 1282, so that a fitting stability of the second positioning element 128 and the taste improvement filter-cartridge 123 can be further improved.

The water inlet pipeline b1 is connected to the raw water inlet 111 of the filtering housing 11. The pre-filtering mesh 2, the water intake solenoid valve 94 and the booster pump 4 are connected in series sequentially in the water inlet pipeline b1 along a water flowing direction. The pre-filtering mesh 2 is configured for filtering the larger rust and slit in the raw water. The raw water intake solenoid valve 3 is used for controlling communication and cutoff of the water inlet pipeline b1. As depicted in FIG. 1, two ends 114-*a* and 114-*b* of the water storage pipeline b4 are both connected to the pure water opening 114, the water intake solenoid valve 94, the lower-pressure switch 93, the water storage container 91 and the water pump 92 are connected in series sequentially in the water storage pipeline b4. The pure water pipeline b2 is connected to the pure water outlet 112 in the filtering housing 11. The one-way valve 5, the high pressure switch 6 and the tap 88 are connected in series sequentially in the pure water pipeline b2 in the water flowing direction. The one-way valve 5 is able to be opened only in a single direction from the pure water outlet 112 to the tap 88 and is configured for preventing the water in the pure water pipeline b2 from flowing back to the composite filter-cartridge 12. The high pressure switch 6 can detect an open state or a closed state of the tap 88 according to the water pressure in the pure water pipeline b2.

Thus, when the tap 88 is opened, the water purification system 100 states to operate, the raw water intake solenoid valve 3 and the water intake solenoid valve 94 are both opened, and the high pressure switch 6 and the lower-pressure switch 93 are both closed. The raw water enters the raw water pipeline and flows through the pre-filtering mesh 2, the raw water intake solenoid valve 3 and the booster pump 4 sequentially, and then flows into the filtering assembly of the composite filter-cartridge 12 for filtering treatment through the raw water inlet 111 in the filtering housing 11. The pure water obtained after filtered by the filtering assembly flows out through the pure water opening 114 in the filtering housing 11 and flows into the water storage pipeline b4. The pure water flowing into the water storage pipeline b4 flows into the water storage container 91 for storage after flowing through the water intake solenoid valve 94 and the lower-pressure switch 93. The concentrated water produced flows into concentrated water pipeline b3 passing through the concentrated water channel a1 and the concentrated water outlet 113 in the filtering housing 11, and is discharged out of the water purification system 100 passing through the waste water solenoid valve 7.

When one needs to drink, the water pump 92 is started, the pure water stored in the water storage container 91, after pressurized, flows into the circulation channel a2 mentioned above from the pure water opening 114 in the filtering housing 11, and then is filtered by the taste improvement filter-cartridge 123 to improve the taste, and finally flows into the pure water pipeline b2 through the pure water outlet 112 in the filtering housing 11 and flows out for drinking via the tap 88.

Reference throughout this specification to "an embodiment," "some embodiments," "illustrative embodiment," "an example," "a specific example," or "some examples," means that a particular feature, structure, material, or characteristic described in connection with the embodiment or example is included in at least one embodiment or example of the present disclosure. Thus, the illustrative expressions of the terms above throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that changes, variation, alternatives, and modifications can be made in the embodiments without departing from the principle and spirit of the present disclosure, and the scope of the present disclosure is defined by the claims and its equivalents.

What is claimed is:

1. A water purification system, comprising:
   a composite filter-cartridge assembly comprising a filtering housing and a composite filter-cartridge disposed in the filtering housing, the filtering housing having a raw water inlet, a pure water opening, a pure water outlet and a concentrated water outlet, the composite filter-cartridge comprising a filtering assembly and a taste improvement filter-cartridge disposed downstream from the filtering assembly, the pure water opening being coupled to a water outlet end of the filtering assembly and coupled to a water inlet end of the taste improvement filter-cartridge;
   a booster pump connected to the raw water inlet;
   a waste water solenoid valve connected to the concentrated water outlet; and
   a water storage device connected to the pure water opening via a water storage pipeline, wherein two ends of the water storage pipeline are both connected to the pure water opening, and the water storage device is configured for storing pure water flowing out of the pure water opening.

2. The water purification system according to claim 1, wherein the water storage device comprises:
   a water storage container configured for storing the pure water;
   a low pressure switch connected between the water storage container and the pure water opening;
   a water pump connected between the water storage container and the pure water opening and configured for delivering the pure water in the water storage container to the pure water opening.

3. The water purification system according to claim 2, wherein the water storage device further comprises a water intake solenoid valve having a first end connected to the pure water opening and a second end connected to the low pressure switch.

4. The water purification system according to claim 1, wherein the filtering assembly and the taste improvement filter-cartridge are arranged along a vertical direction.

5. The water purification system according to claim 1, wherein the filtering assembly comprises a pretreatment filter-cartridge and a fine filter-cartridge arranged sequentially from outside to inside, the fine filter-cartridge comprises a central water collecting pipe and a fine filtration membrane wound around the central water collecting pipe, the raw water inlet is coupled to a water inlet end of the pretreatment filter-cartridge, and the central water collecting pipe constitutes a water outlet end of the filtering assembly;
   the composite filter-cartridge further comprises:
      a first end cover disposed to a first end of the filtering assembly in an axial direction and connected to the filtering assembly so as to cover the first end of the filtering assembly in the axial direction; and
      a second end cover formed to be a cylindrical shape and disposed to a second end of the filtering assembly in the axial direction and connected to the pretreatment filter-cartridge,
   wherein the taste improvement filter-cartridge is disposed in the second end cover, the taste improvement filter-cartridge is connected to the central water collecting pipe and located downstream from the fine filter-cartridge, a concentrated water channel and a circulation channel arranged sequentially from outside to inside and spaced apart from each other are defined between the taste improvement filter-cartridge and the second end cover, the concentrated water outlet is coupled to the concentrated water channel, the circulation channel constitutes the water inlet end of the taste improvement filter-cartridge and communicates the pure water opening and the central water collecting pipe, the taste improvement filter-cartridge is provided with a pure water channel configured for the pure water outflow, and the pure water channel is coupled to the pure water outlet.

6. The water purification system according to claim 5, further comprising: a connecting casing disposed in the second end cover and connected to the central water collecting pipe, wherein the concentrated water channel is defined between the connecting casing and the second end cover, the taste improvement filter-cartridge is disposed in the connecting casing, and the circulation channel is defined between the taste improvement filter-cartridge and an inner wall of the connecting casing.

7. The water purification system according to claim 6, wherein a protruding block is provided between the inner wall of the connecting casing and the taste improvement filter-cartridge so that the inner wall of the connecting casing and the taste improvement filter-cartridge are spaced apart, and a gap between the inner wall of the connecting casing and the taste improvement filter-cartridge constitutes the circulation channel.

8. The water purification system according to claim 6, wherein an annular protrusion is formed on the connecting casing, and a water outlet end of the central water collecting pipe is fitted in the annular protrusion.

9. The water purification system according to claim 6, further comprising: a first positioning element and a second positioning element, wherein the first positioning element and the second positioning element are disposed at two axial ends of the taste improvement filter-cartridge and connected to the taste improvement filter-cartridge respectively.

10. The water purification system according to claim 9, wherein the taste improvement filter-cartridge is configured to be a tubular shape, an inner hole of the taste improvement filter-cartridge constitutes the pure water channel, the first positioning element comprises a first positioning body and a first limit protrusion formed on the first positioning body, the first positioning body covers a first end of the taste improvement filter-cartridge adjacent to the central water collecting pipe, the first limit protrusion is fitted in the inner hole of the taste improvement filter-cartridge, the second positioning element comprises a second positioning body and a second limit protrusion formed on the second positioning body, the second positioning body is disposed to a second end of the taste improvement filter-cartridge away from the central water collecting pipe, and the second limit protrusion is fitted in the inner hole of the taste improvement filter-cartridge and provided with a water drain hole penetrating the second positioning element along the axial direction.

\* \* \* \* \*